United States Patent
Ortiz et al.

(10) Patent No.: US 6,919,037 B2
(45) Date of Patent: Jul. 19, 2005

(54) METHOD OF MANUFACTURING AN OPTICAL REFLECTOR

(75) Inventors: José Ortiz, Bobigny Cedex (FR); Laurent Meister, Bobigny Cedex (FR)

(73) Assignee: Valeo Vision, Bobigny Cedex (FR)

( * ) Notice: Subject to any disclaimer, the term of this patent is extended or adjusted under 35 U.S.C. 154(b) by 156 days.

(21) Appl. No.: 10/391,703

(22) Filed: Mar. 19, 2003

(65) Prior Publication Data

US 2003/0184865 A1 Oct. 2, 2003

(30) Foreign Application Priority Data

Mar. 29, 2002 (FR) .............................................. 02 04171

(51) Int. Cl.⁷ .............................................. B29D 11/00
(52) U.S. Cl. .......................... 264/1.9; 264/2.5; 362/459; 385/115
(58) Field of Search .............................. 264/1.25, 1.27, 264/1.9, 2.5; 362/61, 83.1, 459, 465, 507, 512; 385/115–120, 901

(56) References Cited

U.S. PATENT DOCUMENTS 5,833,889 A * 11/1998 Tanikita et al. .............. 264/1.9

FOREIGN PATENT DOCUMENTS

| EP | 0 727 677 A1 | 8/1996 |
| WO | WO 99/32544 | 7/1999 |
| WO | WO 02/24431 A1 | 3/2002 |

* cited by examiner

*Primary Examiner*—Phan T. H. Palmer
(74) *Attorney, Agent, or Firm*—Morgan & Finnegan, LLP

(57) ABSTRACT

The invention proposes a method of manufacturing a hollow optical reflector of the type which comprises a rear body overmolded around the convex rear external face of a front insert, the concave front internal face of which is covered with a reflective layer, the method comprising:
  a step of producing the insert by forming;
  a step of overmolding the body on the insert; and
  a step of depositing the reflective layer on the concave front face of the insert;
wherein the step of depositing the reflective layer is prior to the forming step.

7 Claims, 2 Drawing Sheets

METHOD OF MANUFACTURING AN OPTICAL REFLECTOR

FIELD OF THE INVENTION

The invention proposes a method for the manufacture of an optical reflector.

BACKGROUND OF THE INVENTION

The invention proposes more particularly a method of manufacturing a hollow optical reflector of the type which comprises a rear body overmoulded around the convex rear external face of a front insert, the concave front internal face of which is covered (in particular at least partially) with a reflective coating, the method comprising:

a step of producing the insert by forming;

a step of overmoulding the body on the insert; and a step of depositing the reflective layer on the concave front face of the insert (or on at least part of said face).

Such optical reflectors are generally used in the motor industry for manufacturing lights or headlights for equipping motor vehicles.

The reflective face of an optical reflector is generally concave and its generator is designed so as to obtain a light beam of given conformation.

Production of optical reflectors by moulding of a thermoplastic material, and then coating of the functional internal concave face with a reflective layer which is for example aluminium-based, are known.

However, when the surface of the mould is degraded, or else when it is not at an optimum temperature, the surface of the component obtained has irregularities and rough patches which, even after coating with the reflective layer, are detrimental to the quality of the light beam.

In order to remedy this problem, a proposal has been made to use a surfacer which fills in the various rough patches of the surface of the moulded component in order to form a smooth surface and which is next coated with the reflective layer.

However, when the reflective face has a complex shape, and it has sharp edges, the surfacer generally has a tendency to make these edges smoother, so that it also is detrimental to the quality of the light beam.

The document EP-A-0 727 677 proposes to produce the reflective face on an insert produced from a sheet of thermoformed plastic material, to overmould the body of the optical reflector on faces of the insert which are not intended to form the light beam, and then to coat the functional concave surface with the reflective layer.

The thermoforming of the plastic sheet makes it possible to have reflecting surfaces of very high quality and which are not impaired during moulding of the body. However, in the case of a complex reflecting surface, certain areas are sometimes difficult to access, so that the whole reflecting surface is not sufficiently fully covered by the reflective layer.

SUMMARY OF THE INVENTION

In order to remedy these drawbacks, the invention proposes a method of the type described previously, characterised in that the step of depositing the reflective layer is prior to the forming step.

According to other characteristics of the invention:

the step of forming the insert is a step of thermoforming a sheet;

the moulding step consists of injecting into a mould a mixture which is composed of the material constituting the body and a gas in liquid form and which is capable of forming a foam in the mould;

during the moulding step, the front face of the insert rests on a protuberance of a block of the mould which has a shape complementary to that of the front face.

Other characteristics and advantages of the invention will emerge from a reading of the following detailed description, for the understanding of which reference should be made to the accompanying figures, amongst which:

DESCRIPTION OF THE PREFERRED EMBODIMENTS

For the description of the invention, the vertical, longitudinal and transverse orientations in accordance with the indicators V1, L1, T1 and V2, L2 and T2 shown in the figures will be adopted non-limitatively.

Figure 4:
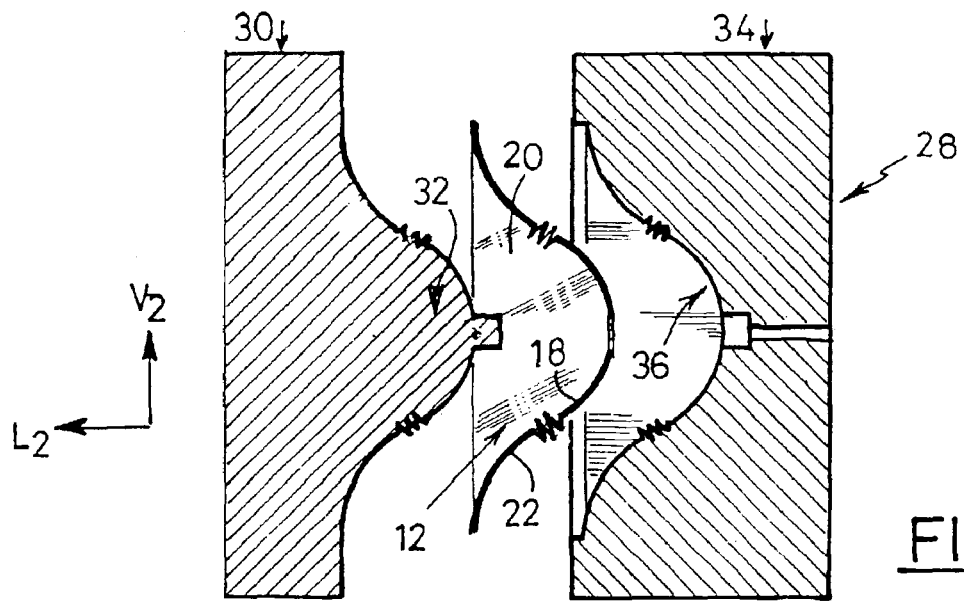
FIGS. 4 and 5 are longitudinal and transverse sections of the insert and the mould depicting the successive stages of the step of overmoulding the body in accordance with the invention.

The direction from back to front as being the longitudinal direction and from right to left referring to FIG. 4 will also be adopted.

In the description which follows, identical, similar or analogous elements will be designated by the same reference numbers.

Figure 7:
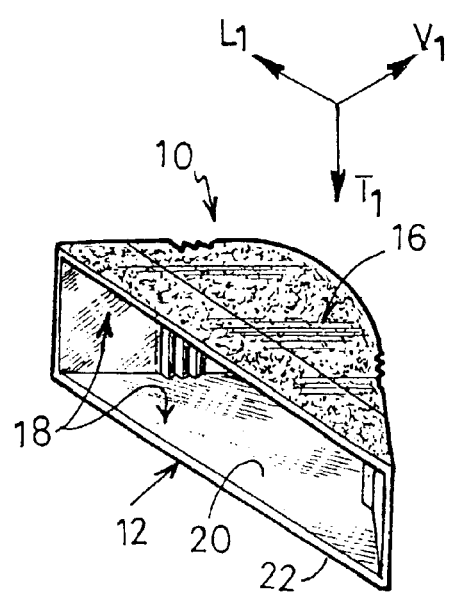
FIG. 7 is a perspective view from below of the optical reflector obtained after the overmoulding step depicted in FIGS. 4 and 5.

FIG. 7 depicts an optical reflector 10 which is a hollow element produced in two parts. It has a concave insert 12 which is produced from a sheet of thermoformed plastic material 14, and which has a concave front internal face 18 which is covered with a reflective layer 20 in particular an aluminium-based one, and a convex rear external face 22.

The optical reflector 10 also has a body 16, which gives the reflector 10 its structural rigidity, and which is overmoulded around the rear face 22 of the insert 12.

FIGS. 1 to 5 depict the successive steps of a method of producing the optical reflector 10, in accordance with the invention.

According to a first step of the method, not depicted, a first front face 14a of the sheet 14 is coated with a reflective layer 20 based on aluminium or another reflective material, by any known method, for example by vacuum deposition or by another method such as Physical Vapour Deposition (PVD) or Plasma Enhanced Chemical Vapour Deposition (PECVD).

Figure 1:
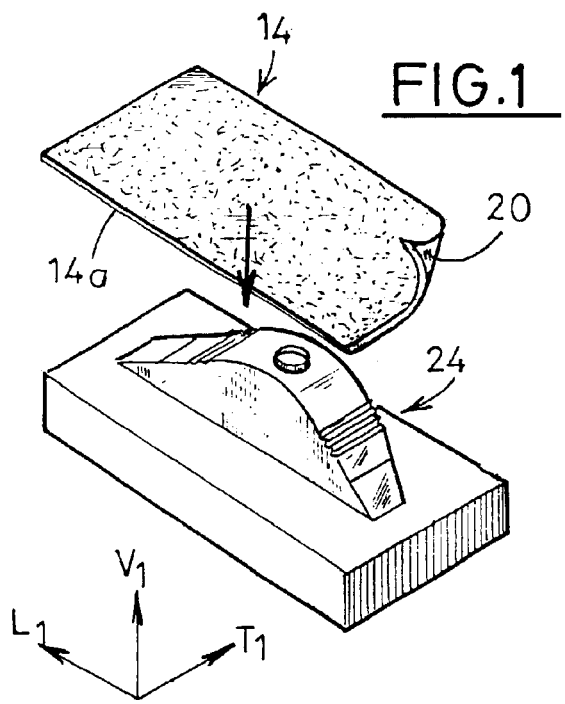
FIGS. 1 to 3 are schematic views in perspective which depict the successive stages of the step of thermoforming the insert from a thermoplastic sheet, in accordance with the invention.
Figure 2:
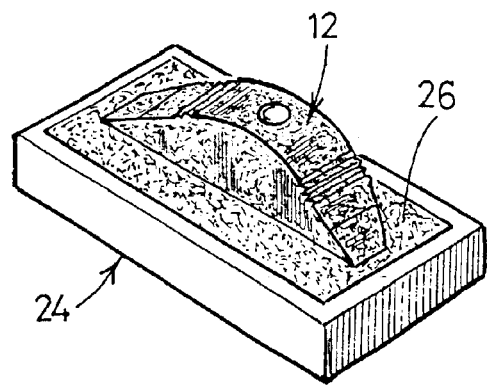
Figure 3:
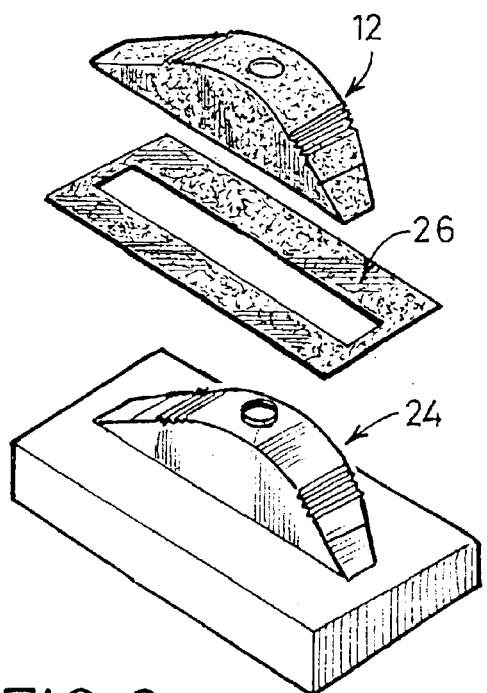

A second step of the method depicted in FIGS. 1 to 3 consists of producing the insert 12 by forming the sheet 14.

For this, a die 24 is used, the shape of which is determined so that the first face 14a of the sheet 14 takes the shape of the die 24 in order to form the first faces 18 of the insert 12.

Here, the die 24 is in relief, and the sheet 14 is therefore positioned with its first face 14a facing the die 24 so that the front face 18 is concave.

Conversely, and according to a variant, not depicted, the die 24 is hollow and the sheet 14 is then positioned with its first face 14a opposite to the die 24.

The sheet 14 is made from a thermoplastic material, for example polycarbonate. Thus, for forming of the sheet 14, the latter is heated and then applied onto the die 24. So that the sheet 14 takes the exact shape of the die 24, a vacuum is produced between the sheet 14 and the die 24, so as to flatten the sheet against the die 24.

In a variant, without departing from the scope of the invention, the thermoforming can be achieved by other technologies well known in the art.

The insert 12 is then obtained which, as depicted in FIG. 3, is removed from the mould after cooling, and its edges 26 are cut.

Figure 5:
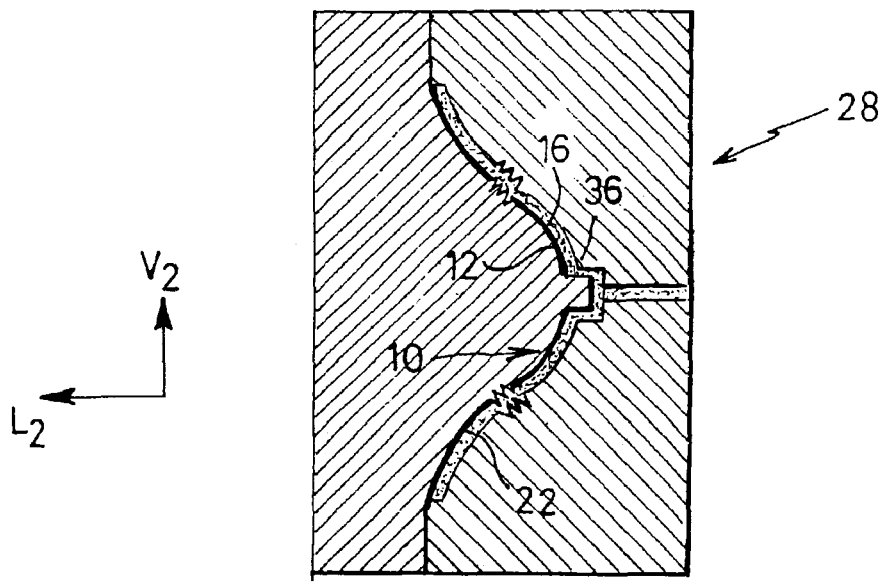
Figure 6:
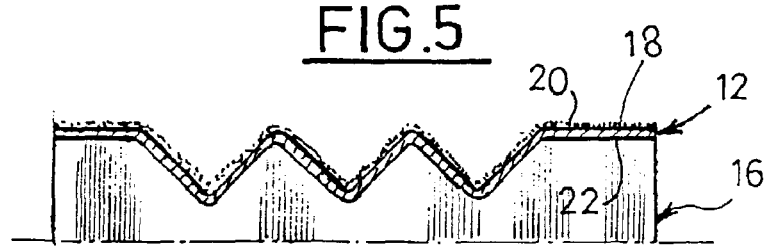
FIG. 6 is a longitudinal section on a larger scale of the optical reflector obtained by the method in accordance with the invention.

According to a third step of the method, depicted in FIGS. 4 and 5, the insert 12 is placed inside a mould 28 for overmoulding of the body 16 around the rear face 22 of the insert 12.

The mould 28 is formed of a fixed block 30 which has a protuberance 32 which has a shape complementary to that of the front face 18 of the insert 12, which makes it possible on the one hand to position the insert 12 in the mould 28 and on the other hand to prevent the insert 12 becoming deformed during moulding.

The mould 28 is also formed of a movable block 34 having an impression which defines a volume 36, with the rear face 22 of the insert 12, when the mould 28 is closed.

The volume 36 is next filled with a thermoplastic substance in order to form the body 16 of the reflector 10. The injected substance is a mixture of a thermoplastic material and a gas in liquid form. When the substance is inside the volume 36, the gas expands, to form a foam. Such a substance and its use are for example described in the document EP-A-1 040 158.

The formation of such a foam makes it possible to reduce the amount of material used.

When the foam forming the body 16 has cooled, that is to say it has rigidified, the assembly is then removed from the mould and forms the reflector 10.

It will also be understood that simple mechanical inversions can constitute variant embodiments of the invention. For example, the material injected into the mould does not have to be in the form of a foam.

Furthermore, the coating of the sheet 14 can be carried out before the cutting thereof, that is to say when it is still in a roll. Deposition of the reflective layer 20 can then be performed continuously, hence a considerable time saving compared with the prior art where each optical reflector was coated one after another with the reflective layer.

One very important advantage of the invention is that it makes it possible to deposit reflective layers on materials whose surface condition is not excellent: even with initial surface conditions of average quality, reflectors of entirely satisfactory optical quality are obtained after deposition of the reflective layer. The appearance constraints which it was possible to have with the standard layer deposition methods can thus be avoided. Consequently, polymer materials with a significant filler level can be used for the material constituting the body of the reflector. These fillers can be introduced either for cost reasons, or as a filler for strengthening the polymer material. With the invention, the proportion of filler in the polymer can be at least 10% by weight, and possibly up to 60% to 70% by weight of the total weight of the body of the reflector, while obtaining a satisfactory level of optical surface quality after deposition of the reflective coating. For constituting the polymer of the reflector, the choice can be made for example from amongst one or more of the following polymers: polycarbonate, polyamide or polyethylene, either thermoplastic or thermosetting, preferably containing filler as mentioned above. The fillers can be organic or mineral, for example based on carbon or calcium carbonates, and can be in the form of particles, fibres, etc.

What is claimed is:

1. A method of manufacturing a hollow optical reflector of the type which comprises a rear body overmoulded around the convex rear external face of a front insert, the concave front internal face of which is covered with a reflective layer, the method comprising:

a step of producing the insert by forming;

a step of overmoulding the body on the insert; and a step of depositing the reflective layer on the concave front face of the insert;

wherein the step of depositing the reflective layer is prior to the step of producing the insert by forming.

2. A method according to claim 1, wherein the step of forming the insert is a step of thermoforming a sheet.

3. A method according to claim 2, wherein the moulding step consists of injecting into a mould a mixture which is composed of the material constituting the body and a gas in liquid form and which is capable of forming a foam in the mould.

4. A method according to claim 1, wherein, during the moulding step, the front face of the insert rests on a protuberance of a block of the mould which has a shape complementary to that of the front face.

5. An optical reflector obtained according to the method in accordance with claim 1, wherein the material constituting the body of said reflector is based on polymer(s) with a proportion of filler of at least 10% by weight, in particular between 10% and 70% by weight.

6. A motor vehicle lighting and/or signalling device having at least one optical reflector according to claim 5.

7. A motor vehicle equipped with at least one device according to claim 6.

* * * * *